Patented May 31, 1932

1,860,472

UNITED STATES PATENT OFFICE

WALTER MIEG, OF OPLADEN, AND ROBERT BERLINER, OF LEVERKUSEN-ON-THE-RHINE, GERMANY, ASSIGNORS TO GENERAL ANILINE WORKS INC., OF NEW YORK, N. Y., A CORPORATION OF DELAWARE

VAT DYESTUFFS OF THE ANTHRAQUINONE ACRIDONE SERIES

No Drawing. Application filed June 14, 1929, Serial No. 371,046, and in Germany June 25, 1928.

The present invention relates to new vat dyestuffs of the probable general formula

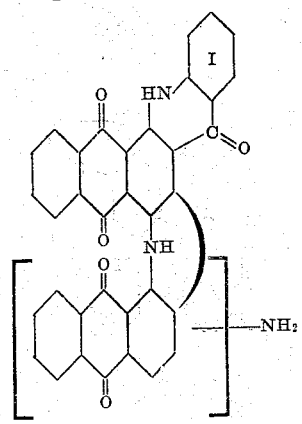

wherein the nucleus marked I may be further substituted by halogen.

In accordance with the invention dyestuffs of the above mentioned formula can be prepared, for example, by reacting with a 4-halogen-anthraquinone acridone upon a monoacylated diamonoanthraquinone or vice versa with a 4-aminoanthraquinone acridone upon an acylated amino-halogen-anthraquinone according to known methods, causing carbazol ring formation, for example by the interaction of concentrated sulfuric acid, and saponifying the acylamino group. The latter reaction can obviously be combined with the carbazol ring formation to one step of working.

The products thus obtainable form dark powders difficultly soluble in the usual organic solvents, dyeing cotton from an alkaline hydrosulfite vat strong reddish grey to black shades, which, in spite of the free amino group being present in the molecule, possess valuable fastness properties also to chlorine.

The following examples illustrate our invention, without limiting it thereto:—

*Example 1.*—5 parts by weight of the condensation product of trichloroanthraquinone-acridone and 1-benzoylamino-5-aminoanthraquinone are introduced into 50 parts by weight of sulfuric acid monohydrate at 20° C. and stirred for about half an hour at this temperature. 60 parts by weight of 20% fuming sulfuric acid are then gradually added at 20–30° C., whereupon the intermediate product first formed is oxidized to the carbazole. The solution which is at first of an olive coloration thereupon becomes deep blue. Then 30 parts of water are added with vigorous stirring, the temperature being allowed to rise gradually to 100–120° C. When a test portion dissolved in concentrated sulfuric acid no longer shows the blue coloration, but a violet red coloration, the whole melt is poured into water, boiled, filtered and washed with water.

The product thus obtainable which probably corresponds to the formula

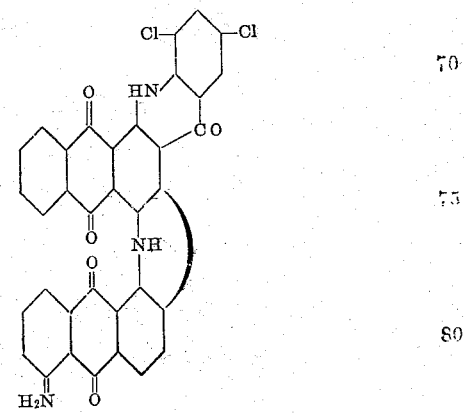

forms dark flakes which dye cotton from a yellowish brown hydrosulfite vat brown shades which, according to the strength of the dyeing, on hanging in air pass into a reddish grey to black shades of very satisfactory fastness properties also to chlorine.

*Example 2.*—3 parts by weight of the carbazole derivative obtainable in accordance with Example 1 from trichloroanthraquinone-acridone and 1-benzoylamino-4-aminoanthraquinone are heated in 30 parts by weight of concentrated sulfuric acid at 80–90° C. for a prolonged period until a test portion dissolved in sulfuric acid no longer shows a greyish blue coloration, but a dirty red coloration. The melt is then poured into water and worked up as described in Example 1. The dyestuff is obtained in greyish blue flakes. It dyes cotton from a yellowish brown hydrosulfite vat brown shades, which on hanging in air pass into a powerful bluish grey, which turns to black at dyeings of about 7% strength or more.

We claim:—

1. The compounds of the probable general formula

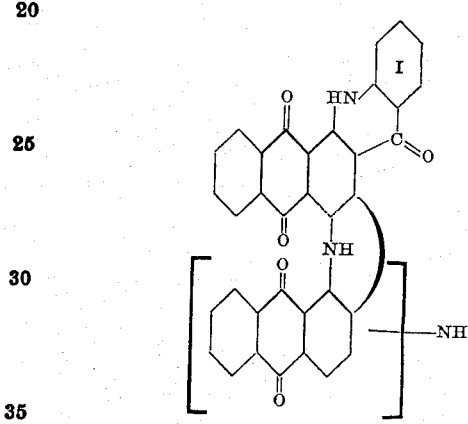

wherein the nucleus marked I may be substituted by halogen, said compounds forming dark powders difficultly soluble in the usual organic solvents, dyeing cotton from an alkaline hydrosulfite vat strong reddish-grey to black shades of good fastness properties also to chlorine.

2. The compounds of the probable general formula

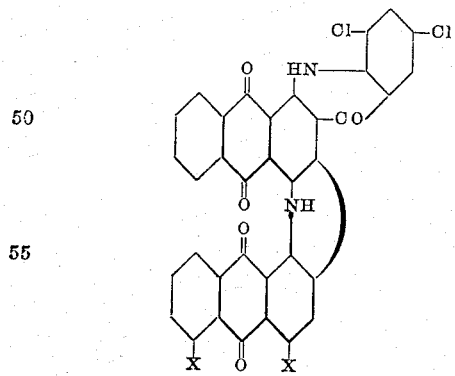

wherein one X stands for hydrogen and the other X for the amino group, said compounds forming dark powders, dyeing cotton from an alkaline hydrosulfite vat strong grey to black shades of good fastness properties also to chlorine.

3. As a new product, the vat dyestuff corresponding to the formula:

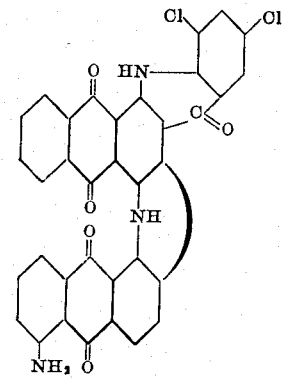

which product forms dark flakes which dye cotton from a yellowish brown hydrosulfite vat brown shades which, on exposure to air, change to reddish-grey to black shades of good fastness properties, also to chlorine.

4. As a new product, the vat dyestuff corresponding to the formula:

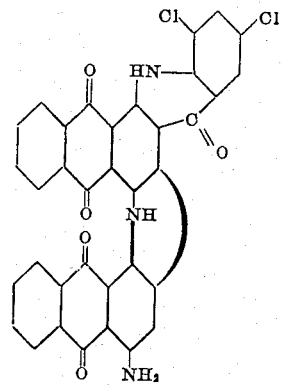

which product forms greyish-blue flakes which dye cotton from a yellowish-brown hydrosulfite vat brown shades which, on exposure to air, change to powerful bluish-grey to black shades of good fastness properties, also to chlorine.

In testimony whereof we have hereunto set our hands.

WALTER MIEG. [L. S.]
ROBERT BERLINER. [L. S.]